United States Patent [19]

Duvall, III

[11] Patent Number: 5,258,619
[45] Date of Patent: Nov. 2, 1993

[54] PULSED BIAS RADIATION DETECTOR

[75] Inventor: Robert L. Duvall, III, Torrance, Calif.

[73] Assignee: Hughes Aircraft Company, Los Angeles, Calif.

[21] Appl. No.: 129,520

[22] Filed: Nov. 18, 1987

Related U.S. Application Data

[63] Continuation of Ser. No. 647,299, Sep. 4, 1984.

[51] Int. Cl.$^5$ .......................... G01J 5/00; H01J 40/14
[52] U.S. Cl. ............................. 250/338.1; 250/214 B; 250/214 C; 250/370.01
[58] Field of Search ............... 250/214 B, 214 C, 338, 250/370.01, 338.1

[56]  References Cited

U.S. PATENT DOCUMENTS

| | | | |
|---|---|---|---|
| 3,325,644 | 6/1967 | Frye et al. | 250/338 |
| 3,446,963 | 5/1969 | Kohashi et al. | 250/338 |
| 3,795,803 | 3/1974 | Ancker-Johnson . | |
| 3,806,729 | 4/1974 | Caywood . | |
| 3,818,230 | 6/1974 | Kubo | 250/338 |
| 3,842,274 | 10/1974 | Greene et al. . | |
| 3,904,879 | 9/1975 | Amingual et al. . | |
| 3,914,610 | 10/1975 | Bigbie | 250/338 |
| 3,963,925 | 6/1976 | Breazeale . | |
| 4,039,928 | 8/1977 | Noftsker et al. | 323/326 |
| 4,225,883 | 9/1980 | Atta et al. | 250/338 |
| 4,259,576 | 3/1981 | Gridley et al. . | |
| 4,292,514 | 9/1981 | Ohtomo | 250/214 C |
| 4,438,348 | 3/1984 | Casper et al. | 250/214 C |
| 4,464,048 | 7/1984 | Farlow | 250/214 B |

OTHER PUBLICATIONS

Cohen-Solal, et al; "Epitaxial (CdHg) Te Infrared Photovoltaic Detectors"; Appl. Physics Let.; vol. 19, No. 10; 15 Nov. 1971.

Kireev, P. S.; "Fast Radiation Detectors Using Photoresistive $Cd_xHg_{1-x}Te$"; Soviet Physics–Doklady; vol. 15, No. 8, Feb. 1971.

Pawlikowski, J. M.; "Some Properties of Photovoltaic $Cd_xHg_{1-x}Te$ Detectors For Infrared Radiation"; Infrared Physics, vol. 15, p. 331; 8 Jan. 1975.

Article entitled "High-Speed Room-Temperature HgCdTe $CO_2$-Laser Detectors" by Wieslaw Galus and Frederick S. Perry, Published in the Nov., 1984 edition of *Laser Focus/Electro-Optics*, pp. 76–82.

*Primary Examiner*—Stephen C. Buczinski
*Attorney, Agent, or Firm*—Michael W. Sales; Wanda K. Denson-Low

[57] ABSTRACT

Methods and apparatus are disclosed for broadening the bandwidth of a radiation detector and diminishing heat generated noise generated within the detector in order to enhance detectivity. The improved performance is achieved by applying a pulsed bias to the detector which consists of a sequence of waveforms which reduces the duty cycle of the detector in comparison to a detector subjected to a constant bias. A sophistication of this use of a pulsed bias is the utilization of a swept bias which employs a sequence of waveforms having gradual rise-times which further reduces unwanted detector noise and enhances detectivity.

10 Claims, 4 Drawing Sheets

MODULATED SIGNAL
(440 KHz, 1500 μSEC)

DETECTOR AND
PRE-AMP NOISE (1500 μSEC)

PULSED BIAS RADIATION DETECTOR

This application is a continuation of application Ser. No. 647,299, filed Sep. 4, 1984.

BACKGROUND OF THE INVENTION

Field of the Invention

The present invention relates to means and methods for pulse biasing a radiation detector for reducing its duty cycle and thereby minimizing heat-generated noise while simultaneously broadening the bandwidth of the detector.

Description of the Technology

Radiation detectors are transducers which indicate the presence of the radiation by working in conjunction with a detection circuit that measures the change in some physical characteristics of the detector as it senses radiation. Photoconductive detectors utilize crystals of photosensitive materials which change resistance when subjected to radiant energy. The first materials which were used for photoconductive cells included silicon and germanium. Later these elemental semiconductors were doped with impurities such as copper, zinc, and gold. Various binary and tertiary alloys such as lead selenide, indium antimonide, and mercury cadmium telluride (HgCdTe) were also developed for use in the detector crystals, though the latter is usually only effective when cooled to cryogenic temperatures.

The change in resistance is caused by the absorption of photons at the sensing surface of the crystal which, in turn, produces free charge carriers in the crystal. This mobilization of electrons and holes alters the electrical conductivity of the detector. The variation in resistivity induced by the incident photons can be used to modulate a current flow through the detector which can be imposed upon it by placing a bias voltage across the crystal.

A typical detector circuit is shown in FIG. 1. The detector element is equivalent to a variable resistor, $R_D$, which is connected in series with a load resistor, $R_l$, and a bias battery, VB. The varying voltage, $V_S$, produced across the load resistor is fed to a capacitively coupled preamplifier, and then to a measurement device such as an oscilloscope.

The overall detector performance is largely dependent upon the biasing voltage. A high signal level is achieved by employing a correspondingly high bias voltage because a detector's performance is a function of the product of the signal voltage and the bias voltage divided by the radiant power incident on the detector. This consideration is limited, of course, by the maximum power that the detector can dissipate. Another constraint on the bias voltage in semiconductor photon detectors is the deleterious effect of generation-recombination noise. This source of signal degradation is caused by fluctuations in the rate in which charge carriers are generated and recombined. High bias fields produce excessive generation-recombination noise due to the thermal heating of the detector element.

Detector performance is quantified in terms of its responsivity R, which is defined as detector output per unit input. Most infrared detectors are used in conjunction with an optical modulator or chopper which suppresses unwanted background and spurious signals, defines the spectral bandpass of the system, and improves discrimination capabilities between target and background by enhancing radiation contrast. A chopper is used to increase the detectability of a particular target which appears to the detector as a small object against a large background. By using a modulator which alternately transmits and completely blocks the relatively small target image, the detector receives an alternating pattern of incident target radiation which resembles a series of pulses. Since the background such as a cloud or horizon which the target appears against extends across a much larger angle of view, the optical modulator does not completely block the radiation which the detector receives from the background. The detector, therefore, sees an alternating radiation from the target and relatively steady radiation from the background. A filtering circuit coupled to the detector output is used to discriminate these two different components of incident radiation in order to suppress unwanted background signals. As a result of this modulation, both the input and output of the IR detectors are alternating quantities. For this reason, responsivity, R, is calculated in terms of root-mean-square (rms) amplitude measurements, and is calculated using the following expression:

$$R = \frac{V_s}{EA_d}$$

where $V_s$ = signal voltage taken across the load resistor;
$E$ = rms value of irradiance on the detector in watts/cm$^2$; and
$A_d$ = sensitive area of the detector in cm$^2$.

The units of responsivity are therefore volts/watt. This measurement of detector output per unit input does not, however, indicate the minimum radiant flux that can be detected. In order to quantify this measurement of detector performance, the level of noise inherently present in the output that obscures the signal $V_S$ must be factored into the responsivity ratio. The product of the reciprocal of the responsivity value R and the rms value of the noise voltage at the output, $V_N$, is the noise equivalent power (NEP) of the detector:

$$NEP = \frac{1}{R} V_N = \frac{EA_d}{V_S} V_N.$$

NEP, which is measured in watts, delineates the rms level of incident infrared energy required to produce a signal to noise ratio of unity. The generally accepted figure of merit for detectors is based upon NEP. The detectivity, D, of a detector is simply the inverse of NEP:

$$D = \frac{1}{NEP} \ (W^{-1}).$$

The most convenient means of comparing the utility of different detectors is a normalized version of detectivity, D*:

$$D^* = D(A_d \Delta f)^{\frac{1}{2}} = \frac{(A_d \Delta f)^{\frac{1}{2}}}{NEP} \ (CmHz^{\frac{1}{2}}w^{-1})$$

where $\Delta f$ = electrical bandwidth.

Normalized detectivity represents the signal to noise ratio when one watt of radiant energy is sensed by a detector having an area of cm² and when output noise is measured with an electrical bandwidth of 1 Hz.

Previous attempts to enhance detector performance by maximizing D* have included innovations in the design, fabrication, and deployment of detector crystals. U.S. Pat. No. 3,963,925—Breazeale describes an infrared detector and a method for its fabrication in which a pair of spaced electrodes are formed on a slab of bulk intrinsic semiconductor material for increasing photoconductive responsivity. U.S. Pat. No. 3,904,379—Amingual, et al., disclose a photovoltaic infrared detector which includes semiconductor material comprising a pair of oppositely charged conductive regions separated by a junction plane. The sensitive surface of this detector is disposed perpendicular to the junction plane in order to maximize impedance and detector sensivity. J. M. Pawlikowski, et al., discuss techniques for shifting photosensivity maxima by altering the stoichiometry of the p-n junction region of photovoltaic crystals in the article entitled "Some Properties of Photovoltaic Detectors for Infrared Radiation," which can be found in *Infrared Physics*, Volume 15, p. 331 (1975, Pergamon Press). In the article "Fast Radiation Detectors Using Photoresistive $Cd_xHg_{1-x}Te$", P. S. Kireev, et al., describe the use of solid solutions of cadmium and mercury tellurides which have been used to produce a wide range of photodetectors. See Volume 15, Number 8 of *Soviet Physics*, p. 755 (February 1971). Other United States patents which provide descriptions of the background of this technology include U.S. Pat. Nos. 4,242,276—Gridley, et al.; 3,842,274—Greene, et al.; 3,806,729—Caywood; and 3,795,803—Ancker-Johnson. Another related technical article is "Epitaxial (CdHg)Te Infrared Photovoltaic Detectors", by G. Cohen-Solal, et al., from *Applied Physics Letters*, Volume 19, Number 10, p. 436 (Nov. 15, 1971).

One means of optimizing detectivity is to supply the detector with the highest possible bias voltage, since, as noted above, $$Ra \frac{V_B}{\Phi_s}.$$

The practical limitation of this tactic is the concomitant noise which is generated by high bias fields and which degrades and obscures the detector signal. This increased noise which lowers D* is a result of increased generation-recombination due to the thermal heating of the detector element. Currently commercially available photoconductive HgCdTe elements which are employed in detector arrays by the Hughes Aircraft Company provide D* levels which extend between $10^{10}$ and $10^{11}$ cmHz$^{\frac{1}{2}}$W$^{-1}$ over a high bandwidth past 1 MHz for an incident radiation wavelength of 10.6 μm. These high bandwidth detectors achieve the results depicted by the solid curves in FIG. 2 when biased with constant currents of 5, 10, and 15 milliamperes. These bias currents correspond to bias fields of 50, 100, and 150 v/cm. The 150 v/cm bias field substantially represents the general range of the highest optimal steady state bias for these particular detector elements. The highest optimal steady state bias is that level of constant, non-intermittent voltage which maximizes detectivity without unduly exacerbating the problem of signal degradation by increasing the noise portion of the signal.

It would be highly desirable and advantageous to develop extended bandwidth infrared detectors having high detectivities. High performance detectors which could exhibit such enhanced sensitivity would improve communications and pointing and tracking systems vital to the aerospace industry. Thermal sensing medical diagnostic equipment would also benefit from more sensitive detectors as would most all equipment which employs infrared detectors.

SUMMARY OF THE INVENTION

The present invention provides a solution to the continually increasing demand for more sensitive and more useful detectors and satisfies a long felt need by supplying a method of improving currently existing detector systems. The detectivity of photoconductive HgCdTe detectors can be greatly increased by using a pulsed as opposed to a constant bias. A pulsed bias is a bias which differs from a constant bias in that a pulsed bias consists of a sequence of waveforms. Detectivity can also be enhanced by employing a non-steady state bias, which consists of any sequence of waveforms which is not a flat, unvarying, constant voltage bias. The pulsed bias effectively reduces the duty cycle of the detector crystal, and optimizes the signal-to-noise ratio by preventing excessive heating of the crystal. By limiting generation-recombination transitions of carriers in the crystal during any given pulse interval, the unwanted noise is significantly reduced. The intermittent biasing enables the crystal to exhibit extended bandwidths of 3 to 5 MHz and beyond without a loss of sensitivity. Such high bandwidths are beneficial when the detectors are employed in laser rangefinder systems. Pulsed bias detectors can withstand bias fields of 200 v/cm, which were previously considered to exceed optimal high constant bias levels. The pulses can also be shaped and tailored to enable the detectors to provide improved performance in specialized applications.

It is, therefore, an object of the present invention to provide high sensitivity detectors which will substantially out-perform other currently available PC HgCdTe detectors by yielding higher D* levels resulting from previously unusable high bias fields.

Another object is to provide for extended bandwidth detectors which will achieve bandwidths of 3 to 5 MHz and beyond without a loss in sensitivity for application in advanced rangefinder detection systems.

Another object is to develop techniques for reducing certain components of electrical noise in the detector by reducing the bias duty cycle of detector elements.

Yet another object of the present invention is to utilize specific sequences of bias waveforms with predetermined rise-times and periodic characteristics which improve detector performance.

An appreciation of other aims and objects along with a more complete and comprehensive understanding of the present invention may be achieved through the study of the following description of a preferred embodiment in an addition to reference to the accompanying drawings.

DESCRIPTION OF A PREFERRED EMBODIMENT

Figure 3:
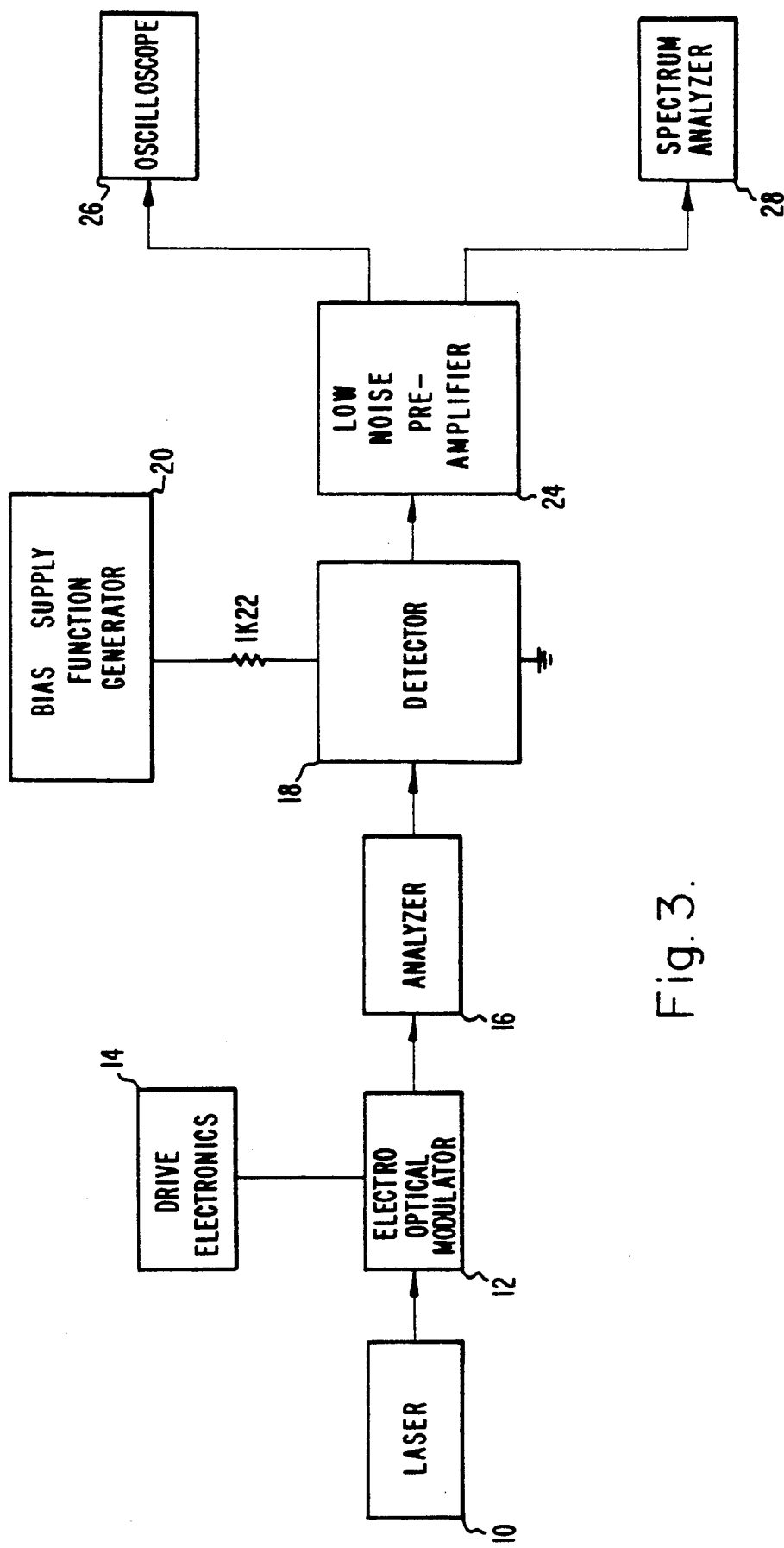
FIG. 3 depicts the experimental apparatus utilized to validate the improved performance levels obtained when pulsed bias techniques are employed.

FIG. 3 illustrates the experimental apparatus which can be used to measure the improved performance and detectivity benefits of PC HgCdTe detectors with pulsed bias techniques.

A CW-$CO_2$ laser 10 is used in conjunction with an CdTe electro-optical amplitude modulator 12 and its related drive electronics 14 to illuminate a photoconductive HgCdTe detector element 18 with 10.6 $\mu$m radiation through an analyzer 16. A bias supply function generator 20 is connected to the detector element 18 through a 1K $\Omega$ load resistor, 22. The bandwidth and D* are measured by an oscillope 26 and spectrum analyzer 28 coupled to the detector element 18 through a low noise preamplifier 24. This arrangement is similar in configuration to certain parts of a laser rangefinder which uses a $CO_2$ laser to illuminate a target and which then receives and processes the reflected laser radiation through a frequency modulator or chopper, a set of optics components, and then finally to the detector array.

Figure 4A:
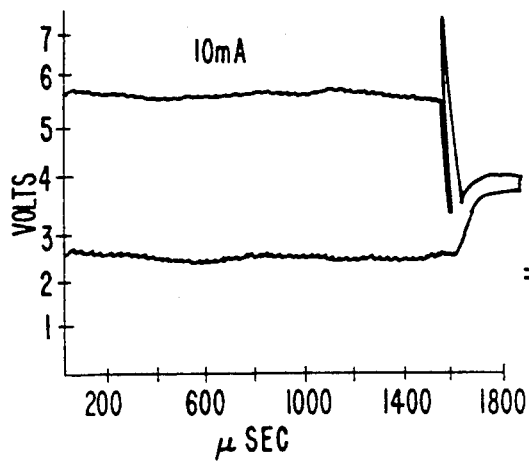
FIGS. 4a, 4b, 5a, 5b, 6a, and 6b reveal experimental results which compare photoconductive gain and noise levels at 440 KHz versus incident radiation wavelength for various magnitudes of pulsed bias fields.
Figure 4B:
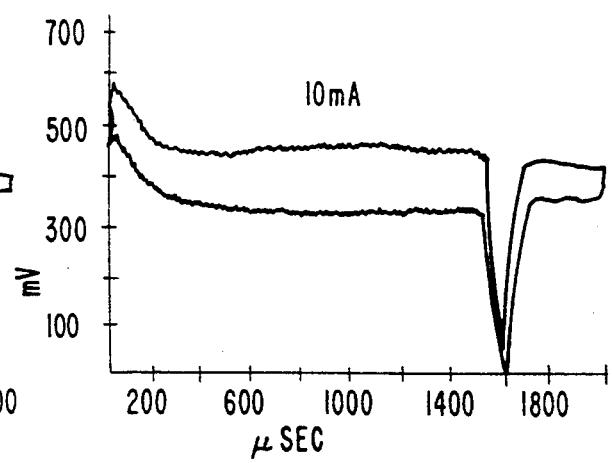
Figure 5A:
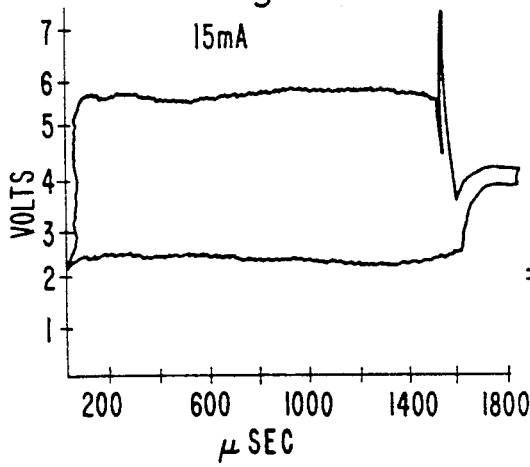
Figure 5B:
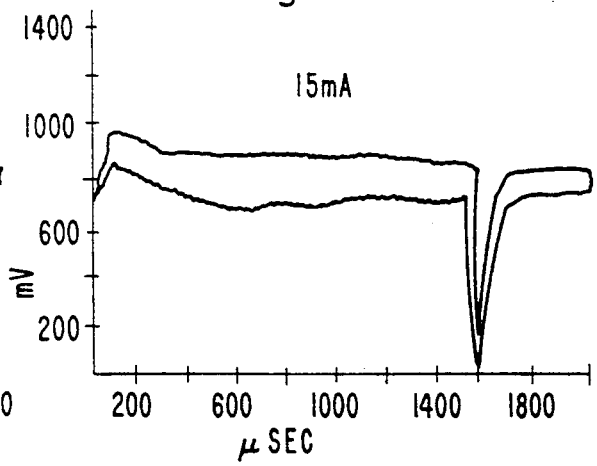
Figure 6A:
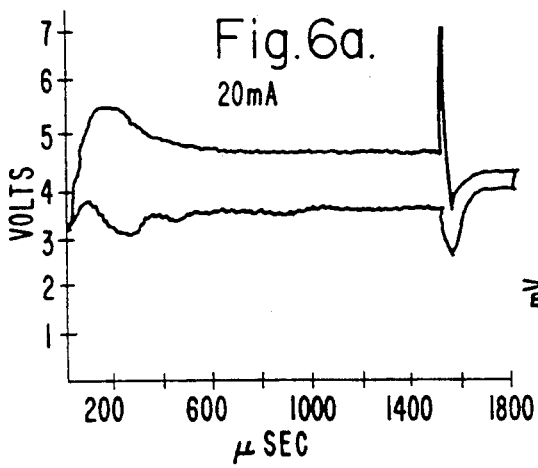
Figure 6B:
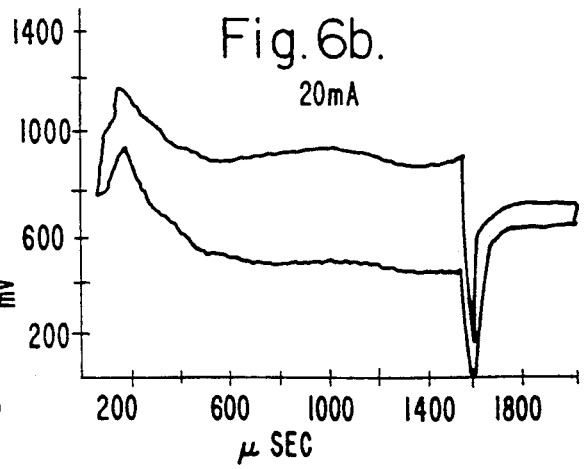

FIGS. 4, 5, and 6 compile and compare the results of tests conducted with the apparatus described above. These three figures are presented together in 2 columns. The left column, which includes FIGS. 4a, 5a, and 6a, depicts levels of the detector signal in volts modulated at 440 KHz over a duration of 1500 $\mu$sec. Each succeeding figure shows increased levels of pulsed bias, proceeding from 10 Ma up to 15 mA and 20 mA respectively. The right column, which includes FIGS. 4b, 5b, and 6b, depicts levels of detector and preamp noise in millivolts for 1500 $\mu$sec for 10, 15, and 20 mA pulsed bias respectively. As shown in FIGS. 4a and 5a, the modulated signal is substantially constant for the 10 mA to 15 mA bias region, as is expected for a detector operating in the gain-saturated minority carrier sweep out region. At 20 mA bias, heating of the detector element moves the spectral cutoff below the frequency of the $CO_2$ TEA laser radiation incident on the crystal (10.6 $\mu$m), and the signal sensitivity declines rapidly, as is evidenced by the irregular, sinuous shape of the plot in FIG. 6a. FIGS. 4b, 5b, and 6bshow that the magnitude of the noise increases by about a factor of 2 over a 200-400 microsecond interval, which is determined by the thermal time constant of this detector.

Figure 1:
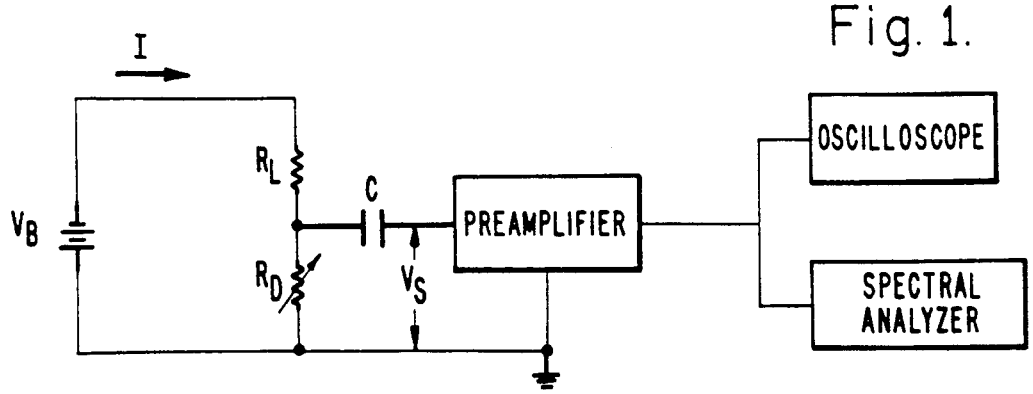
FIG. 1 is a schematic diagram of a basic photoconductive detector circuit.
Figure 2:
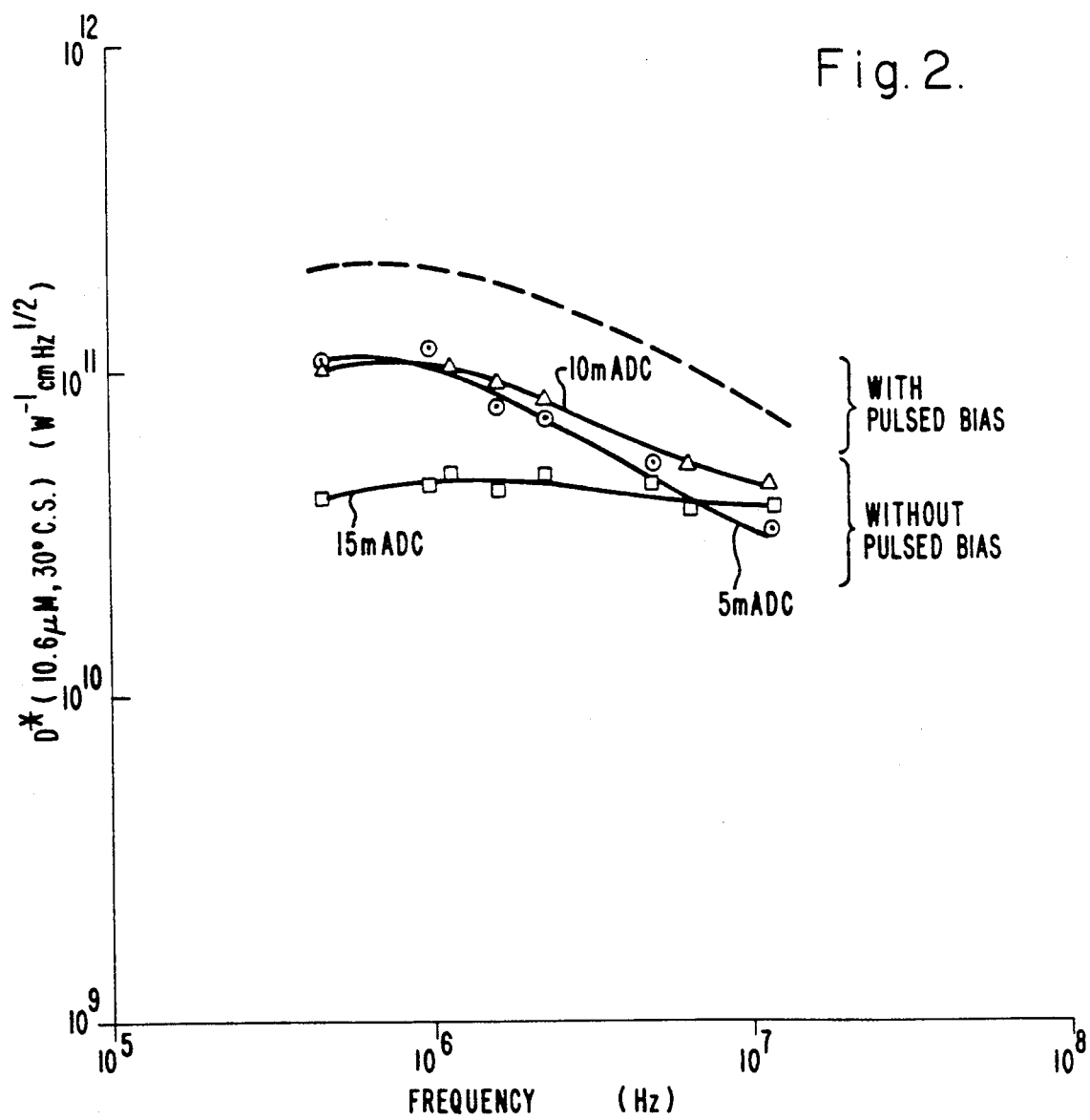
FIG. 2 is a set of graphs plotted on a logarithmic ordinate and which compares the detectivity (D*) versus frequency of PC HgCdTe detectors when operated with constant bias field (solid curves) and the operation of the same detector using a pulsed bias (dashed curve).

Comparison of the traces in FIGS. 4a, 5a, and 6awith the curves in FIG. 2 indicates that during the first 150 microseconds of the pulsed bias, an increase of from 1.5 to 2.0 times the value of D* of the current bias field operation (FIG. 2) can be achieved. The broken line in FIG. 2 represents results achieved over the first 100 $\mu$s using a 10 mA (100 v/cm) pulsed bias (10.6 $\mu$M radiation, cold shield $-30°$). The increased height of the broken line over the three solid graphs in FIG. 2 which show the results of a constant direct current (D.C.) bias of 5, 10, and 15 mA (50, 100, and 150 v/cm) dramatically demonstrate the improved D* levels which result from the use of a pulsed bias.

Figure 7:
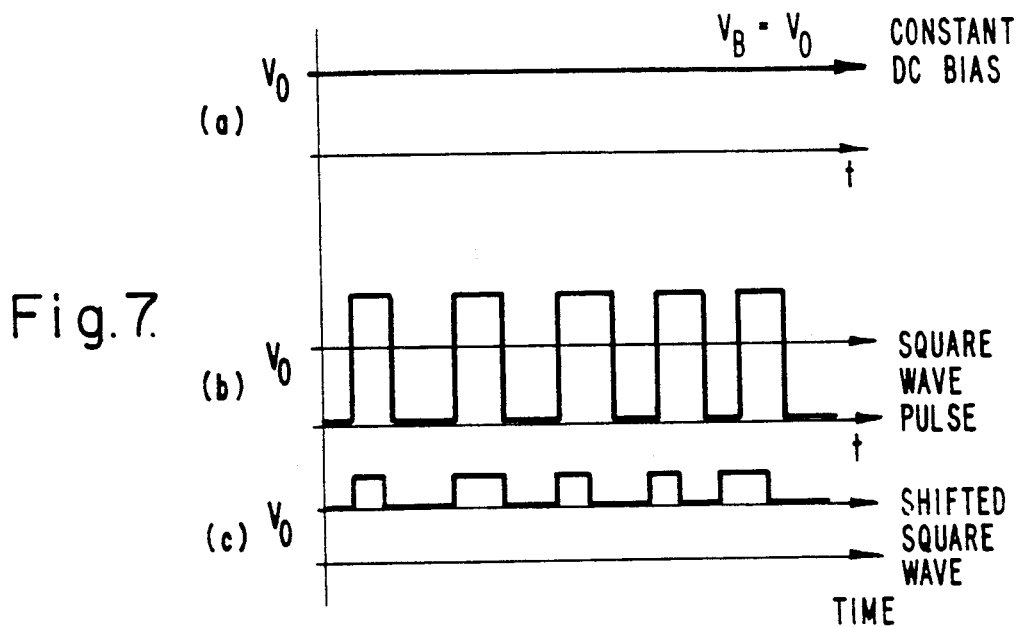
FIG. 7 shows a variety of typical pulsed bias waveforms which may be employed in the operation of the present invention.

FIGS. 7(a),(b), and (c) compare the graph of a constant d.c. bias versus time 7(a) to various exemplary pulsed bias waveforms, 7(b) and 7(c), which may be utilized to obtain improved detectivity and extended bandwidth. The two simple square wave pulses shown in FIGS. 7(b) and 7(c) are illustrative only and are not intended to suggest that only these waveforms are suited to the pulsed bias invention. FIG. 7(c) illustrates a square wave similar to that shown in FIG. 7(b), although the latter has been shifted up so that its minimum voltage level is a positive, non-zero voltage.

A more sophisticated version of the relatively straightforward use of square-wave or step pulses may be employed to achieve even better detector performance. When the pulses are produced in sequence having shaped waveforms with gradual, predetermined rise-times as opposed to virtually instantaneous rise-times, detectivity over the initial stages of the pulse is further enhanced.

Figure 8:
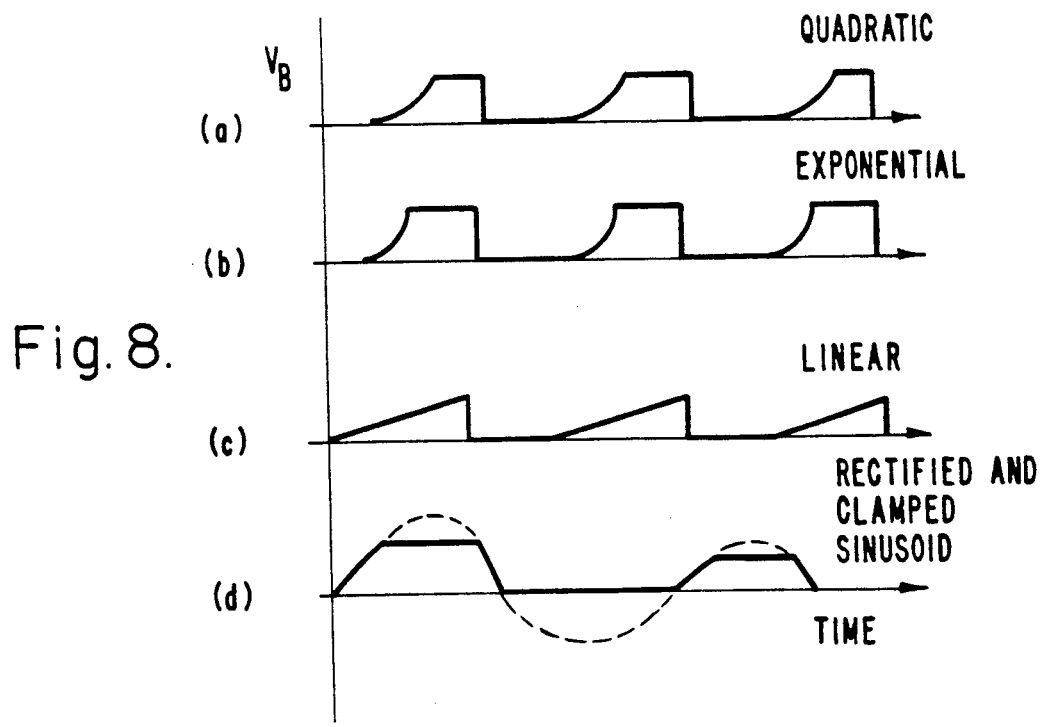
FIG. 8 shows a series of waveforms which may be applied to a detector in order to achieve the benefits which result from the use swept bias techniques.

These specialized bias signals may be referred to as a swept pulsed bias or simply as a swept bias. FIGS. 8(a), 8(b), 8(c), and 8(d) depict some illustrative examples of these specialized swept bias waveforms which consist of sequences of waveforms having particularly shaped initial portions and specific rise-times. The important common characteristic of these various configurations is the degree of control over detector heating which they afford. The rise-times and shapes of the initial portions of the waveforms in FIG. 8 are generally gradual as opposed to the abrupt, vertical initial portions of the waveforms depicted in FIG. 7. Gradual pulse rise-times can be implemented through the use of linear, quadratic, exponential, or sinusoidal bias waveforms. By imposing predetermined mathematical constraints on the rise-times and pulse intervals, the detector operation can be matched to particular design considerations and system requirements. The predetermined, gradually increasing wave-shapes used in this swept bias technique help to minimize unwanted detector heating by varying the duty cycle of the detector. The various wave-shapes and rise-times are selected by experimentally determining which set of waveforms best meets a given detector and design situation. This innovative swept bias technique includes varying the waveform parameters of rise-time, fall-time, peak to peak values, time between pulses, pulse slope, pulse width, and pulse amplitude.

When the detector is used in a laser rangefinder, the implementation of a swept bias not only produces increased D* levels, but also affords other advantages.

The use of a swept bias in a laser rangefinder detector similar to the apparatus shown in FIG. 3 starting at 0 mA and increasing to 15 mA (150 v/cm) in quadratic fashion over an interval of 50 to 60 microseconds results in the additional benefit of eliminating a large portion of detector overload conditions which are usually associated with the first several microseconds following a transmitted laser pulse. This overload is caused by the optical backscatter of the tail of the transmitted laser pulse.

Swept pulsed bias of photoconductive detectors can provide increased flexibility for system designers confronted by the stringent requirements of high detectivity and extended bandwidth applications.

Although the present invention has been described in detail with reference to a particular preferred embodiment, persons having ordinary skill in the art will appreciate that various modifications and alterations may be made without departing from the spirit and scope of the invention.

What is claimed is:

1. An improved method for enhancing the temporal response of a radiation detector comprising the step of: biasing said detector with a non-steady state bias signal for a time sufficient to broaden the bandwidth of said detector and for a time sufficient to diminish bias-generated noise in said detector during said biasing.

2. An improved method for enhancing the temporal response of a radiation detector as claimed in claim 1 further comprising the step of applying a bias field in said detector greater than 100 v/cm and sufficient to maximize the bandwidth of said detector.

3. An improved method of experimentally selecting the optimum bias for a particular photoconductive radiation detection crystal comprising the step of:
   illuminating said crystal with radiation;
   biasing said crystal with a pulsed signal;
   reading the output of said crystal to determine the effectiveness of said pulsed signal in increasing the bandwidth and the signal-to-noise ratio of said crystal; and
   varying said biasing in an amount and for a time sufficient to maximize the detected bandwidth and the signal-to-noise ratio of said crystal.

4. An improved method of experimentally selecting the optimum bias for a particular radiation detection crystal according to claim 3, further comprising the step of illuminating said photoconductive detection crystal with a $CO_2$-TEA laser.

5. An improved method of experimentally selecting the optimum bias for a particular radiation detection crystal according to claim 3 further comprising the step of varying said bias such that said pulsed signal has a predetermined and varied duty cycle.

6. An improved method of experimentally selecting the optimum bias for a particular radiation detection crystal according to claim 3 further comprising the step of biasing said detection crystal such that said pulsed signal has predetermined amplitude and rise-time which enhance the detectivity of said crystal by reducing detector heating.

7. A method for enhancing the temporal response of a radiation detector comprising biasing said detector with a non-steady state bias signal that is characterized by a time-dependent function increasing in relative amplitude to approximately 150 volts/centimeter greater than its initial amplitude over a predetermined period of time having an approximate duration of up to 100 microseconds.

8. A method of detecting infrared radiation comprising the steps of:
   biasing a detector with a pulsed bias field in excess of 100 v/cm for a time sufficient to increase the bandwidth of said detector to over 1 MHz without loss of sensitivity due to generation-recombination noise caused by heating of said detector; and
   varying and shaping the wave-forms of said pulsed bias field for a time sufficient to improve the sensitivity of said detector.

9. The method of claim 8 in which said pulsed bias field is characterized by a time-dependent function increasing in relative amplitude to about 150 v/cm greater than its initial amplitude over a predetermined period of time having an approximate duration of up to 100 microseconds.

10. An improved method for enhancing the temporal response of a photoconductive radiation detector comprising the step of:
    biasing said detector with a varying electrical signal for a time sufficient to broaden the bandwidth of said detector and for a time sufficient to diminish heat generated in said detector during said biasing.

* * * * *